UNITED STATES PATENT OFFICE.

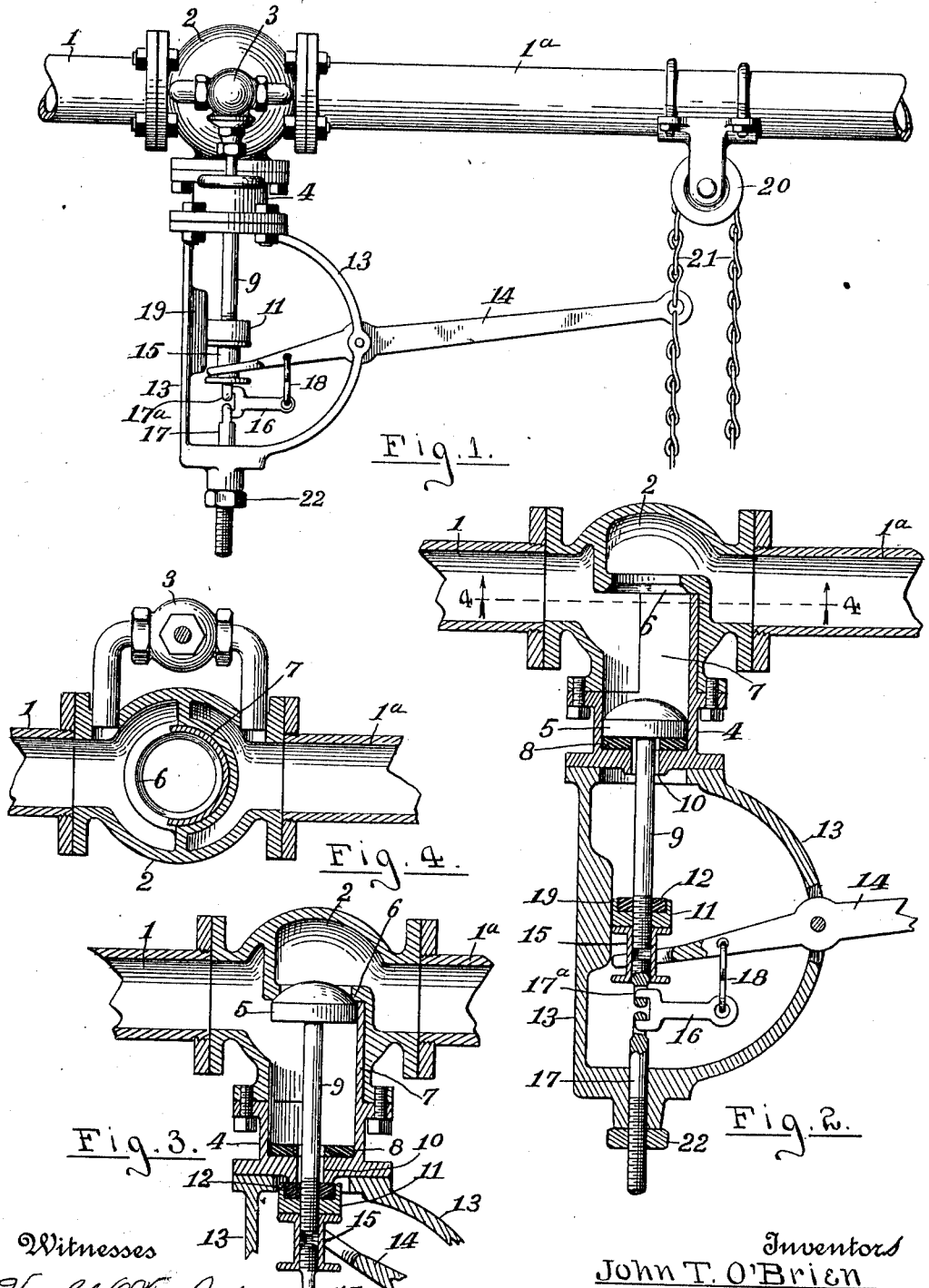

JOHN T. O'BRIEN AND WELLINGTON G. SARGENT, OF GRAND RAPIDS, MICHIGAN.

VALVE FOR AUTOMATIC FIRE-EXTINGUISHERS.

1,012,269.  Specification of Letters Patent.  Patented Dec. 19, 1911.

Application filed March 13, 1911. Serial No. 614,153.

*To all whom it may concern:*

Be it known that we, JOHN T. O'BRIEN and WELLINGTON G. SARGENT, citizens of the United States of America, residing at Grand Rapids, in the county of Kent and State of Michigan, have invented certain new and useful Improvements in Valves for Automatic Fire-Extinguishers; and we do hereby declare the following to be a full, clear, and exact description of the invention, such as will enable others skilled in the art to which it appertains to make and use the same.

Our invention relates to improvements in valves for automatic fire extinguishers and more particularly to valves for shutting off the flow of water therein and its object is to provide a valve that will automatically open whenever the extinguishers proper are closed and the pipes filled with water and which can be readily and quickly closed whenever it is desirable to shut off the water from the extinguishers and to provide the device with various new and useful features hereinafter more fully described and particularly pointed out in the claims reference being had to the accompanying drawings in which:—

Figure 1 is a side elevation of a device embodying our invention; Fig. 2 an enlarged vertical section of the same as it appears when open; Fig. 3 a detail in vertical section showing the valve closed; and Fig. 4 a horizontal sectional detail on the line 4—4 of Fig. 2.

Like numbers refer to like parts in all of the figures.

1 and 1ᵃ represent a pipe to supply water to a series of automatic fire extinguishers (no shown), 2 the case of our improved shut-off valve. 3 a by-pass valve for the same. 4 a cylindrical extension on the valve case in which extension is mounted a valve closure 5 which engages a seat 6 in the valve body 2 to shut off the flow of water from the pipe 1 to the pipe 1ᵃ and when opened moves downward in the manner of a piston in the extension 4 and is provided with a stem 9 extending through the bottom of the extension and freely movable in an opening 10 which opening is larger than the stem 9 to permit free movement of the same therein. The under side of the closure 5 is adapted to engage a disk seat 8 loosely surrounding the stem 9 and thus close off the flow of water through the opening 10 when lowered in contact with the same. On the stem 9 is a cup-shaped member 11 having an elastic closure 12 therein which when the valve 5 is engaged with the seat 6 engages a circular seat surrounding the opening 10 and closes the same against escape of water therethrough.

13 is a D-shaped frame extending downward from the extension 4 and pivoted in the curved side of the same is a lever 14 having a bifurcated end engaging a spool-shaped coupling 15 on the lower end of the stem 9. In the bottom of this frame is a screw 17 and a plug 17ᵃ is inserted in the bottom of the spool and a coupling lever 16 having a forked end engages openings in this screw and plug and connects the same to force the valve 5 down upon the seat 8. By turning a nut 22 on the end of a screw the valve may be mechanically forced down upon the seat 8 to insure no leakage through the opening 10. Ordinarily however, the pressure on the valve of the fluid in the device is sufficient to insure proper closing of the same. This coupling lever 16 is connected by a link 18 to the lever 14 and the latter has play enough on the spool coupling 15 to trip the lever 16 out of the screw before starting to raise the valve 5, as hereafter described.

To guide the stem 9 vertically a rib 19 is provided on the vertical side of the frame which rib is traversed by the forked end of the lever 14 and the cup 11. The valve 5 is also guided by a concave vertical member 7 extending upward from the bottom of the extension 4. On the pipe 1ᵃ is mounted a pulley 20 and extending over the same is a chain 21 which also extends downward to be conveniently operated manually. This chain is attached to the lever 14 to raise and lower the outer end of the same.

Normally the device is open as in Fig. 2 and whenever it is desirable to shut off the flow of water through the pipe 1 and 1ᵃ the lever 14 is pulled down by the chain 21 which first trips the coupling lever 16 out of the screw 17 and then moves the valve 5 up to the seat 6. The pressure beneath the valve will now hold it in position with the closure 12 completely closing the opening 10 around the stem 9. Whenever the extinguishers are all closed and the water is to be turned on the by-pass is opened which equalizes the pressure in the pipes 1 and 1ᵃ whereupon the valve 5 will fall by gravity and the escape of water from beneath the same through the opening 10 will permit the valve to be driven down resting on the seat 8. Or in the event that the pressure is not very great the lever 14 may be raised by the chain 21 producing the same result as opening the by-pass 3.

It will be noted that the device has no packing contacting the stem 9 and thus is not liable to stick nor get out of order.

What we claim is:—

1. A valve for automatic fire extinguishers, comprising a valve body having a valve seat and an opening opposite the seat, a valve adapted to alternately close the seat and said opening, a stem on the valve extending through the opening and of less diameter than the same, means on the outer end of the stem adapted to close said opening and means for shifting the valve.

2. A valve for automatic fire extinguishers, comprising a valve body having a valve seat and a cylindrical extension opposite the seat provided with an opening, a seat surrounding said opening, a valve movable in said extension and adapted to alternately engage the seats, a stem on the valve freely movable in said opening, means for closing said opening mounted on the outer end of the stem, and means for shifting said valve.

3. A valve for automatic fire extinguishers, comprising a valve body having a valve seat, a cylindrical extension on the body opposite the seat having an end opening, a valve seat surrounding said opening, a piston-like valve movable in the said extension and adapted to alternately engage said seats, a stem freely movable in said opening and of less diameter than the same, a cup on the outer end of the stem, and a closure in the cup adapted to close said opening when the valve engages the upper seat to shut off the flow through the body.

4. A valve for automatic fire extinguishers, comprising a valve body having a valve seat and an opening opposite the seat, a valve adapted to alternately close said seat and said opening, a stem on the valve freely movable in said opening and of less diameter than the same, means for closing said opening mounted on the stem, a D-shaped frame attached to the extension and a lever pivoted in the frame and connected to the stem.

5. A valve for automatic fire extinguishers, comprising a valve body having a seat and an opening opposite the same, a valve adapted to alternately close the seat and the opening, a stem on the valve movable in the opening and of less diameter than the same, a cup near the outer end of the stem, a closure in the cup to close said opening, a spool on the end of the stem, a bifurcated lever engaging the spool, a frame on which the lever is pivoted, a screw in the frame, a plug in the spool, a forked coupling lever detachably connecting the screw and plug and a link connecting the levers.

In testimony whereof we affix our signatures in presence of two witnesses.

JOHN T. O'BRIEN.
WELLINGTON G. SARGENT.

Witnesses:
PALMER A. JONES,
LUTHER V. MOULTON.